(12) United States Patent
Azdasht

(10) Patent No.: US 8,330,076 B2
(45) Date of Patent: Dec. 11, 2012

(54) METHOD AND DEVICE FOR REMOVING SOLDER MATERIAL DEPOSITS FROM A SUBSTRATE

(75) Inventor: Ghassem Azdasht, Berlin (DE)

(73) Assignee: Pac Tech - Packaging Technologies GmbH, Nauen (DE)

( * ) Notice: Subject to any disclaimer, the term of this patent is extended or adjusted under 35 U.S.C. 154(b) by 362 days.

(21) Appl. No.: 12/668,508

(22) PCT Filed: Jun. 10, 2008

(86) PCT No.: PCT/DE2008/000971
§ 371 (c)(1),
(2), (4) Date: Jan. 11, 2010

(87) PCT Pub. No.: WO2009/010029
PCT Pub. Date: Jan. 22, 2009

(65) Prior Publication Data
US 2010/0181295 A1    Jul. 22, 2010

(30) Foreign Application Priority Data
Jul. 13, 2007 (DE) .......... 10 2007 033 074

(51) Int. Cl.
*B23K 26/06* (2006.01)
(52) U.S. Cl. ......... 219/121.75; 219/121.84; 219/121.85; 228/264; 228/20.1
(58) Field of Classification Search ............. 219/121.75, 219/121.84, 121.85; 228/119, 264, 20.1
See application file for complete search history.

(56) References Cited

U.S. PATENT DOCUMENTS

| 4,187,973 A | 2/1980 | Fortune |
| 6,119,919 A | 9/2000 | Kasulke |
| 2004/0026383 A1* | 2/2004 | Zakel et al. ............... 219/121.6 |
| 2005/0087588 A1 | 4/2005 | Weigler et al. |

FOREIGN PATENT DOCUMENTS

| DE | 19533171 A1 | 3/1996 |
| EP | 0988129 B1 | 1/2003 |
| WO | 9608338 A1 | 3/1996 |
| WO | 9857774 A | 12/1998 |
| WO | 0228582 A | 4/2002 |

OTHER PUBLICATIONS

"PCT International Search Report dated Nov. 20, 2008 for PCT/DE2008/000971, from which the instant application is based," 2 pgs.

* cited by examiner

*Primary Examiner* — Tu-Tu Ho
(74) *Attorney, Agent, or Firm* — Fredrikson & Byron, P.A.

(57) ABSTRACT

The present invention relates to a method and to a device for separating solder material deposits (12) from a substrate (10), in which a receiving sleeve (19) having a receiving opening (22) is positioned to overlap with a solder material deposit arranged on the substrate in such a manner that an opening edge (21) of the receiving opening is brought into abutment against the substrate in an essentially sealing manner, the solder material deposit is subjected to thermal energy and a sleeve lumen (23) that is defined by the receiving sleeve and that is disposed transverse to a longitudinal axis (30) of the receiving sleeve is subjected to an air flow (28) that is directed to an output device (29) of the receiving sleeve.

13 Claims, 2 Drawing Sheets

METHOD AND DEVICE FOR REMOVING SOLDER MATERIAL DEPOSITS FROM A SUBSTRATE

RELATED APPLICATIONS

This application is a US 371 national stage entry of International Application No. PCT/DE2008/000971, filed Jun. 10, 2008, which claims priority to German Patent Application No. 10 2007 033 074.1, filed Jul. 13, 2007, the teachings of which are incorporated herein by reference.

The present invention relates to a method for removing solder material deposits from a substrate according to claim 1 and a device for performing the method according to claim 5.

In the known soldering methods, in which the soldering of contact substrates is realized with the aid of a so-called "ball-grid-array", solder material deposits are removed by a transfer template from a solder material reservoir and are positioned so as to overlap with the contact substrate for soldering the contact substrate. In order to form the "ball-grid-array" on the transfer template, the same is furnished with a corresponding hole pattern and a vacuum is applied to a rear side thereof for removing the solder material deposits from the solder material reservoir. By means of this measure, the solder material deposits that exhibit a diameter that is at least slightly larger than the holes of the hole pattern are retained in the holes of the hole pattern.

For soldering the contact substrate, the transfer template with the solder material deposits that abut against the terminal face of the contact substrate is pressed against the contact substrate and the solder material deposits are subjected to thermal energy in order to obtain at least partial melting of the same.

As a result of the probably insufficient coating of the terminal faces of the contact substrate with flux and/or due to damage of the wetting-inhibiting surface of the transfer template, there is a likelihood that not all of the solder material deposits are separated from the transfer template. On the one hand, flawed solder spots on the contact substrate are thereby formed and, on the other hand, prior to a subsequent soldering process it is necessary to remove from the transfer template the solder material deposits still remaining adhered thereto.

By means of conducting tests it has been revealed that the removal of adhering solder material deposits by means of mechanical separation, i.e. for instance by scratching, causes damage to the wetting-inhibiting surface of the transfer template, whereby a removal of the solder material deposit from the transfer template can in fact be successfully realized, however, the likelihood of a repeated adherence of a solder material deposit in a subsequent soldering process is potentially increased.

For this reason, an objective of the present invention is to propose a method and a device that enable the removal of adhering solder material deposits in such a manner that the surface of the transfer template is prevented from being damaged.

This objective is attained by a method encompassing the features of claim 1 and a device encompassing the features of claim 5.

In the inventive method for removing solder material deposits from a substrate, a receiving sleeve having a receiving opening is positioned to overlap with a solder material deposit arranged on the substrate in such a manner that an opening edge of the receiving opening is brought into abutment against the substrate in an essentially sealing manner, the solder material deposit is subjected to thermal energy and a sleeve lumen that is defined by the receiving sleeve is subjected to an air flow transversely to a longitudinal axis of the receiving sleeve, the air flow being directed to an output device of the receiving sleeve.

Subjecting the sleeve lumen to the transverse air flow causes a temporary negative pressure at least during the sealing abutment of the receiving opening against the substrate. In combination with the application of thermal energy to the solder material deposit that causes at least partial melting of the same, the solder material deposit is to separated from the substrate surface by means of the vacuum force. Simultaneously, the transverse air flow that is directed to an output device of the receiving sleeve enables the removal of the solder material deposit from the receiving sleeve.

The inventive method hence enables a separation or removal of the solder material deposit from a substrate surface without the direct impact of mechanical tools on the solder material deposit and the substrate surface respectively. The potentially occurring contacting between the receiving sleeve and the substrate surface is confined to an opening edge of the receiving opening abutting against the substrate surface, in order to enable the generation of a negative pressure in the receiving sleeve as a result of the transversely directed air flow. As a function of the size of the volume flow of the transverse air flow it can also be sufficient to move the opening edge of the receiving opening towards the substrate surface by forming a minute gap, namely by avoiding direct contacting of the substrate surface.

It has proved to be particularly advantageous to perform the application of thermal energy to the solder material deposit by means of laser energy, since by means of this measure the occurrence of the desired thermal effects can be locally confined to the solder material deposit without the need for e.g. current-conducting or heat-conducting leads.

It is even possible to completely omit the application of energy supply leads in the region of the receiving sleeve if the laser energy is introduced into the solder material deposit in the form of laser radiation.

It has proved to be particularly advantageous if the laser radiation is focussed by means of a lens device that limits the sleeve lumen of the receiving sleeve. In this process, the lens device can at the same time serve for defining a rearward limit of the sleeve lumen that is disposed to opposite to the receiving opening of the receiving sleeve.

The inventive device for separating solder material deposits from a substrate exhibits a receiving sleeve that is provided with a receiving opening at a contact end thereof and that exhibits an output device adjacent to a limiting device that limits the sleeve lumen in an axial direction, a connecting device that is arranged opposite to the output device for subjecting the sleeve lumen to compressed air and a heating device for subjecting a solder material deposit to thermal energy.

According to a preferred embodiment, the heating device exhibits a laser energy emission device.

If the laser energy emission device exhibits a lens device for focussing a laser beam path on an opening cross-section of the receiving opening being limited by an opening edge, the laser energy emission device can be arranged at any optional distance from the solder material deposit and the opening cross-section of the receiving opening respectively, so that the interior of the receiving sleeve is devoid of devices for supplying the thermal energy to the solder material deposit.

If beyond that the lens device is designed as a limiting device for limiting the sleeve lumen in an axial direction, a configuration of the device with a minimum number of components is possible.

It has proved to be particularly advantageous if the output device is designed as an acceleration device that accelerates the compressed air flow, so that the generation of relatively large negative pressure forces in the sleeve lumen is enabled.

According to an optional embodiment of the device, the output device for accelerating the compressed air flow is designed as a Venturi nozzle.

It has proved to be particularly advantageous for the handling of the device if the receiving sleeve is provided with a positioning device for variable positioning of the receiving sleeve relative to the substrate, so that one and the same receiving sleeve can be used for removing solder material deposits at different surface locations of the substrate.

Besides, it is likewise possible to arrange the receiving sleeve in a receiving sleeve assembly composed of a plurality of receiving sleeves, in order to be able to remove several solder material deposits simultaneously from the substrate surface.

By means of arranging the receiving sleeves in a matrix arrangement of a receiving sleeve assembly, it is possible to configure the arrangement of the receiving sleeves corresponding to the arrangement of the terminal faces on the substrate surface.

In the following paragraphs, a preferred embodiment of the device will be explained in greater detail by means of describing the method that can be realized by using the device with reference to the drawings, wherein.

Figure 1:
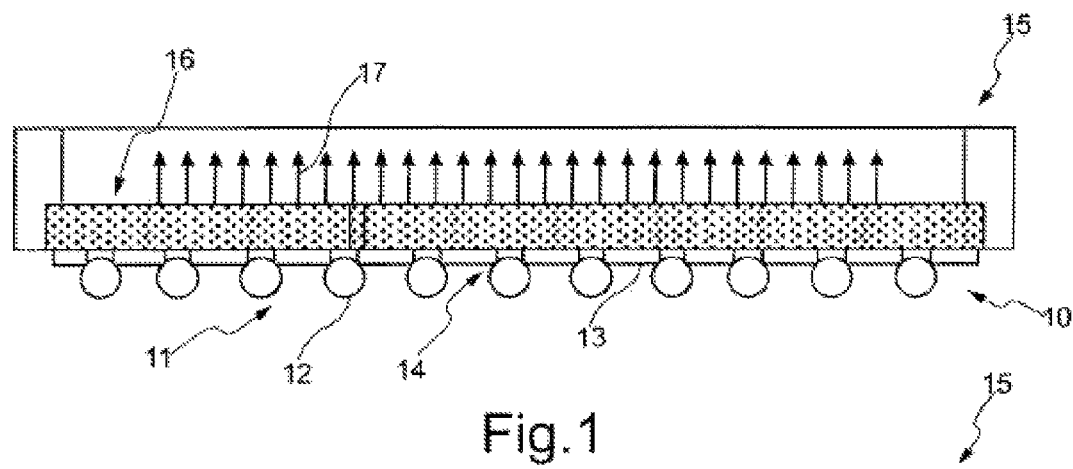
FIG. 1 illustrates a transfer template assembled with a solder material deposit arrangement.

FIG. 1 illustrates a substrate that in the case at hand is exemplarily designed as a transfer template 10 that, in a matrix arrangement being illustrated in FIG. 1 merely in a uniaxial fashion, exhibits a solder material deposit arrangement 11 composed of individual solder material deposits 12 that are arranged in holes 13 of a hole pattern 14 formed corresponding to the matrix arrangement in the transfer template 10. The transfer template 10 is received in a handling device 15 and on its rear side is supported against a porous metal plate 16.

The transfer template 10 serves for the removal of solder material deposits 12 from a solder material reservoir, not illustrated here in greater detail, by means of a negative pressure 17 that exerts an impact on a rear side of the transfer template. As illustrated in FIG. 1, the negative pressure 17 makes it possible to retain the solder material deposits 12 in the holes 13 of the transfer template. In this configuration, the solder material deposit arrangement 11 can be moved so as to be positioned to overlap with a contact substrate, not illustrated here in greater detail, in which position the individual solder material deposits 12 are located above assigned terminal faces of the contact substrate. For soldering the contact surfaces of the contact substrate with the solder material deposits 12, the transfer template 10 is lowered towards the contact substrate and due to the simultaneous impact of pressure and temperature on the solder material deposits 12 a transfer of the solder material deposits 12 to the contact surfaces of the contact substrate is performed with simultaneous melting of the solder material deposits.

Figure 2:
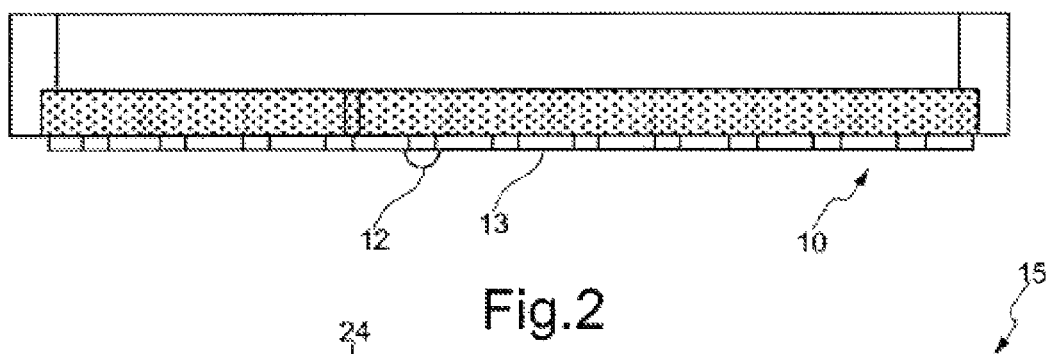
FIG. 2 illustrates the transfer template shown in FIG. 1 after the transfer of the solder material deposit arrangement to a contact substrate.

FIG. 2 illustrates the transfer template 10 after completing the transfer of the solder material deposits 12, wherein for instance as a consequence of damage caused to the wetting-inhibiting surface of the transfer template 10 a solder material deposit 12 has not been separated from the transfer template 10.

Figure 3:
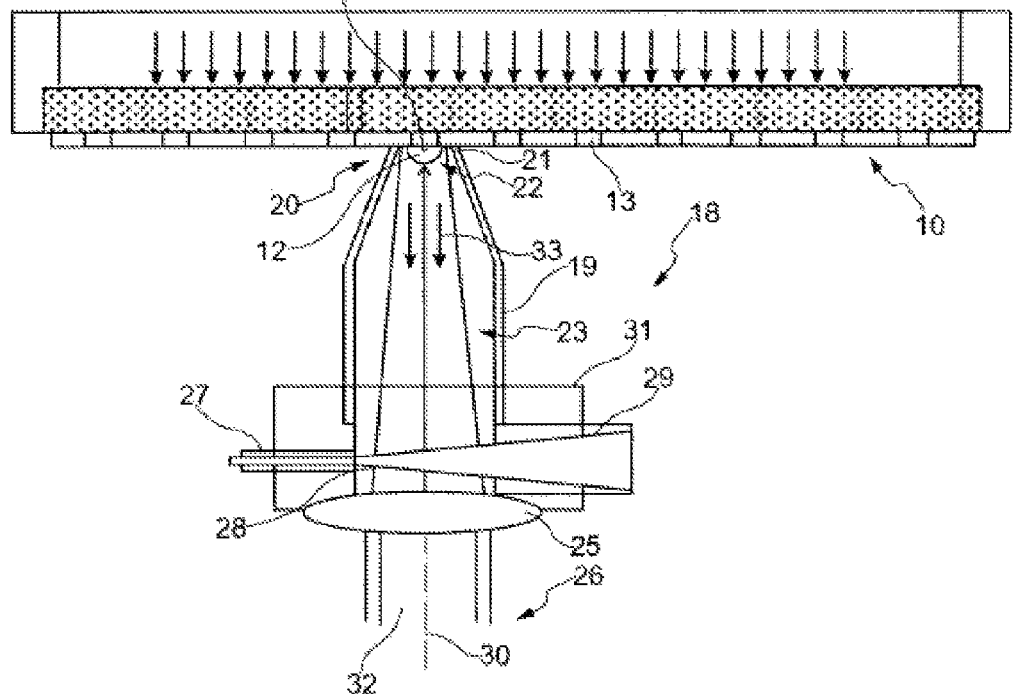
FIG. 3 illustrates a separating device that has been moved towards the transfer template at the beginning of a separating process.

FIG. 3 illustrates the transfer template 10 with a separating device 18 that is employed for separating the solder material deposit 12 that still remains adhered to the transfer template 10.

The separating device 18 exhibits a receiving sleeve 19 that is designed in the form of a nozzle, the contact end 20 thereof that according to FIG. 3 faces the transfer template 10 exhibiting a receiving opening 22 that is limited by an opening edge 21. The receiving sleeve 19 exhibits a sleeve lumen 23 that extends from an opening cross-section 24 of the receiving opening 22 to a lens device 25 that is arranged at the other end of the receiving sleeve 19. According to the exemplary embodiment of the separating device 18 illustrated in FIG. 3, the lens device 25 is received in a handling device 26 together with the receiving sleeve 13.

According to the exemplary embodiment illustrated in FIG. 3, the lens device 25 does not only constitute a component of a laser emission device, not illustrated here in greater detail, but at the same time serves for limiting the sleeve lumen 23. Adjacent to the lens device 25, a compressed air connecting device 27 is arranged in the region of the end of the receiving sleeve 13 opposite to the receiving opening 22, by means of which the sleeve lumen 23 opposite to an output device 29 is subjected to a transverse air flow 28. The output device 29 can for instance be configured as a Venturi nozzle for accelerating by means of expansion the air flow 28 that is disposed transverse to a longitudinal axis 30 of the sleeve lumen 23 and that is induced via the compressed air connecting device 27 in the sleeve lumen 23. According to the exemplary embodiment illustrated in FIG. 3, the compressed air connecting device 27 and the output device 29 are formed in a common flow device 31 that can be combined with the receiving sleeve 13 in a modular fashion.

In order to separate and remove the solder material deposit 12 from the transfer template 10, as illustrated in FIG. 3, the separating device 18 is moved towards the transfer template 10 in such a manner that the opening cross-section 24 of the receiving opening 22 is positioned to overlap with the solder material deposit 12. According to FIG. 3, to this end the opening edge 21 of the receiving opening 22 is moved towards the surface of the transfer template 10 so as to enclose the solder material deposit 12. In this configuration, the application of a laser beam path 32 that is focussed on the solder material deposit 12 by means of the lens device 25 and that causes the at least partial melting of the same is performed on a rear side of the lens device. By means of the melting, the retaining forces that retain the solder material deposit 12 on the surface of the transfer template 10 are reduced. The sleeve lumen 23 is subjected to a transverse air flow via the compressed air connecting device 27, giving rise to the generation of a negative pressure and of corresponding negative pressure forces 33 in the sleeve lumen 23.

Figure 4:
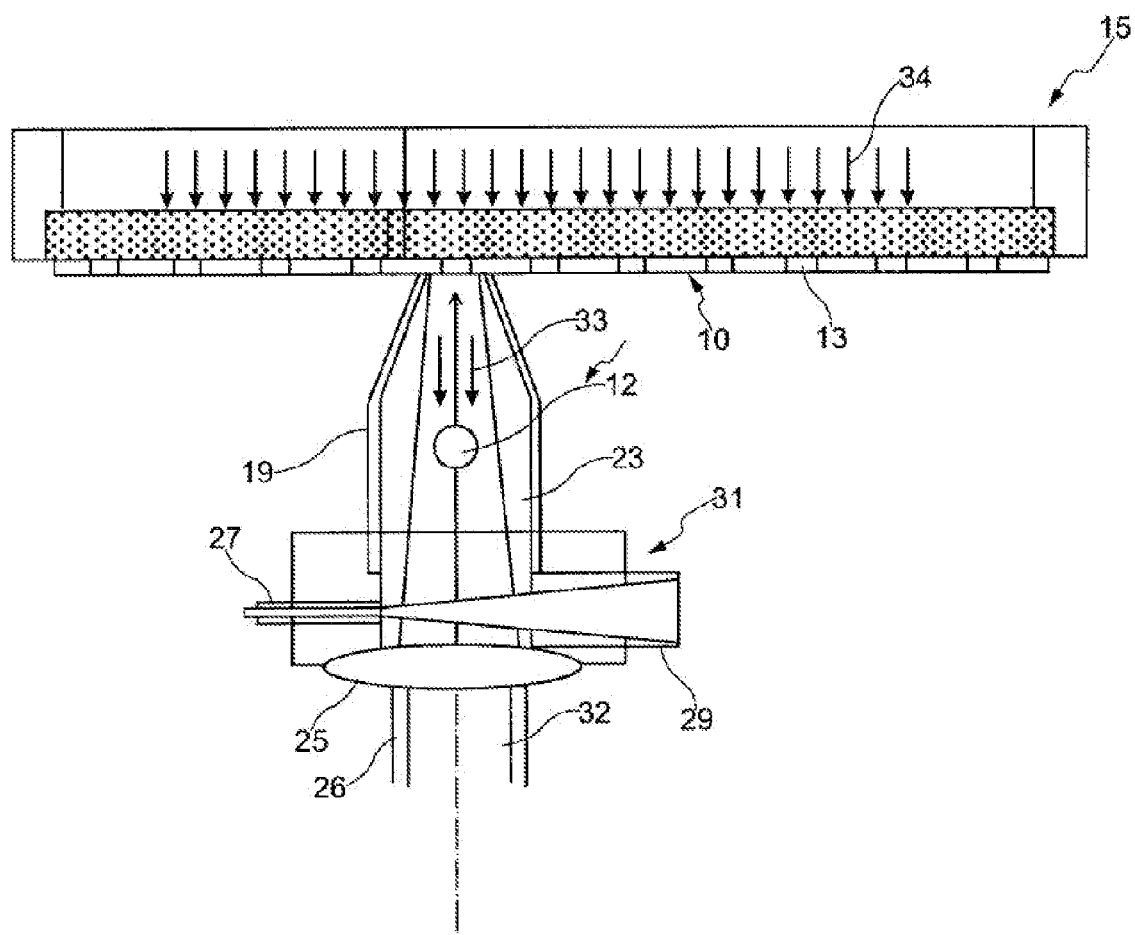
FIG. 4 illustrates the separating device that has been moved towards the transfer template at the end of the separating process.

As illustrated in FIG. 4, the negative pressure forces 33 cause the solder material deposit 12 to become separated from the surface of the transfer template 10 supported by the reduction of the retaining forces as a consequence of the application of thermal energy to the solder material deposit 12. The solder material deposit 12 is moved towards the transverse air flow 28 and is then forcibly carried away by the same in order to be thusly transported through the output device 29 to the outside of the sleeve lumen 23, where the solder material deposit 12 can be disposed of.

In order to support the previously described separating process of the solder material deposit 12, as illustrated in FIG. 4, the transfer template 10 can be subjected to compressed air 34 on a rear side thereof.

The invention claimed is:

1. Method for separating solder material deposits from a substrate, the method comprising the steps of:
    positioning a receiving sleeve having a receiving opening over a solder material deposit arranged on the substrate in such a manner that an opening edge of the receiving opening is brought into abutment against the substrate in an essentially sealing manner;
    subjecting the solder material deposit to thermal energy; and
    subjecting a sleeve lumen that is defined by the receiving sleeve to an air flow that is transverse to a longitudinal axis of the receiving sleeve and is directed to an output device of the receiving sleeve.

2. The method of claim 1, wherein the application of thermal energy to the solder material deposit is performed using laser energy.

3. The method of claim 2, wherein the laser energy is applied to the solder material deposit in the form of laser radiation.

4. The method of claim 3, further comprising the step of focusing the laser radiation by a lens device that limits the sleeve lumen of the receiving sleeve.

5. A device for separating solder material deposits from a substrate, the device comprising:
    a receiving sleeve having a receiving opening at a contact end thereof, said receiving opening comprising an opening edge configured for enclosing said solder material deposits;
    an output device coupled to the receiving sleeve;
    a limiting device adjacent to the output device that limits a sleeve lumen in an axial direction;
    a connecting device that is disposed opposite to the output device for subjecting the sleeve lumen to compressed air; and
    a heating device for subjecting a solder material deposit to thermal energy.

6. The device of claim 5, wherein the heating device is a laser energy emission device.

7. The device of claim 6, wherein the laser energy emission device includes a lens device for focusing a laser beam path on an opening cross-section of the receiving opening.

8. The device of claim 7, wherein the lens device is designed as the limiting device for limiting the sleeve lumen in an axial direction.

9. The device of claim 5, wherein the output device is designed as an acceleration device that accelerates the compressed air flow.

10. The device of claim 9, wherein the acceleration device is designed as a Venturi nozzle.

11. The device of claim 5, wherein the receiving sleeve is provided with a positioning device for variable positioning of the receiving sleeve relative to the substrate.

12. The device of claim 5, wherein the receiving sleeve is arranged in a receiving sleeve assembly comprising a plurality of receiving sleeves.

13. The device of claim 12, wherein the receiving sleeves are disposed in a matrix arrangement within the receiving sleeve assembly.

* * * * *